(12) United States Patent
Cunningham et al.

(10) Patent No.: US 8,567,239 B2
(45) Date of Patent: Oct. 29, 2013

(54) METHOD AND SYSTEM FOR DETERMINING VACUUM LEAKS

(75) Inventors: Ralph Wayne Cunningham, Milan, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 13/162,499

(22) Filed: Jun. 16, 2011

(65) Prior Publication Data

US 2012/0318047 A1    Dec. 20, 2012

(51) Int. Cl.
*G01M 15/09* (2006.01)

(52) U.S. Cl.
USPC .......................................... 73/121; 73/114.37

(58) Field of Classification Search
USPC ............... 73/114.31, 114.32, 114.33, 114.37, 73/121, 128, 129
See application file for complete search history.

(56) References Cited

U.S. PATENT DOCUMENTS

| | | | |
|---|---|---|---|
| 4,779,449 A * | 10/1988 | Bley et al. ...................... 73/40.7 |
| 5,676,101 A | 10/1997 | Kawai et al. | |
| 5,755,101 A | 5/1998 | Free et al. | |
| 6,012,289 A | 1/2000 | Deckard et al. | |
| 6,120,414 A | 9/2000 | Endo et al. | |
| 6,334,834 B1 | 1/2002 | Mizutani et al. | |
| 6,735,942 B2 | 5/2004 | Wild et al. | |
| 6,754,579 B2 | 6/2004 | Kamiya et al. | |
| 6,857,415 B2 | 2/2005 | Kayama et al. | |
| 6,871,918 B2 | 3/2005 | Wild et al. | |
| 6,886,335 B2 | 5/2005 | Tabata et al. | |
| 7,082,869 B2 | 8/2006 | Borsch | |
| 7,216,479 B2 | 5/2007 | Tamura | |
| 7,350,495 B2 | 4/2008 | Harada | |
| 8,267,072 B2 * | 9/2012 | Pursifull ........................ 123/572 |
| 2006/0207314 A1 * | 9/2006 | Kitazawa et al. .............. 73/49.2 |
| 2010/0036566 A1 | 2/2010 | Hayami | |
| 2010/0222980 A1 | 9/2010 | Berr | |
| 2011/0174060 A1 * | 7/2011 | Guazzo et al. .................. 73/40.7 |

FOREIGN PATENT DOCUMENTS

| | | |
|---|---|---|
| EP | 0899737 A2 | 8/1998 |
| EP | 0990793 A2 | 9/2000 |
| EP | 1491748 A2 | 12/2004 |
| EP | 1609970 A2 | 12/2005 |

OTHER PUBLICATIONS

Rollinger, John E., "Method and System for Diagnosing a Vacuum System," U.S. Appl. No. 13/162,481, filed Jun. 16, 2011, 36 pages.

Rollinger, John E., "Method and System for Determining Conditions of an Air Filter," U.S. Appl. No. 13/162,490, filed Jun. 16, 2011, 27 pages.

(Continued)

*Primary Examiner* — Eric S McCall

(74) *Attorney, Agent, or Firm* — Julia Voutyras; Alleman Hall McCoy Russell & Tuttle LLP

(57) ABSTRACT

A method for detecting leaks within a vacuum system is described. The method may detect vacuum system leaks responsive to vacuum pump speed. The method can compensate for changes in barometric pressure so that a single leak threshold may be provided for all altitudes and barometric pressures.

20 Claims, 6 Drawing Sheets

(56) References Cited

OTHER PUBLICATIONS

Pursifull, Ross D., "Method and System for Prioritizing Vehicle Vacuum," U.S. Appl. No. 13/050,700, filed Mar. 17, 2011, 40 pages.

Pursifull, Ross Dykstra et al., "Method and System for Brake Control," U.S. Appl. No. 13/290,873, filed Nov. 7, 2011, 27 pages.

White, Stephen Michael et al., "Engine Throttle Control with Brake Booster," U.S. Appl. No. 13/287,718, filed Nov. 2, 2011, 25 pages.

* cited by examiner

METHOD AND SYSTEM FOR DETERMINING VACUUM LEAKS

BACKGROUND/SUMMARY

Vacuum can be a source of motive force for actuators of a vehicle. Vacuum may be provided via an intake manifold of an engine or via a vacuum pump. In some vehicle vacuum systems, vacuum may be provided by both a vacuum pump and an intake manifold of an engine so that there may be sufficient vacuum during periods of vacuum demand. However, it may be difficult to determine if there are leaks within the vacuum system during vehicle operation when vacuum is being consumed. Further, since barometric pressure can vary with altitude and weather, it may be difficult to establish a vacuum leak rates under various environmental conditions.

The inventors herein have recognized the above-mentioned disadvantages and have developed a method for assessing vacuum system degradation for a vehicle, comprising: operating a vacuum pump during a condition of substantially no vacuum consumption via vacuum consumers of the vehicle; and providing an indication of vacuum degradation for the vehicle via a single vacuum leak threshold, the single leak threshold referenced to a leak rate at a plurality of altitudes.

By limiting consumption of vacuum from a vacuum system, it may be possible to accurately determine a vacuum leak rate of a vacuum system during vehicle operation. In particular, vacuum consumption by vehicle systems can be limited so as to increase a signal to noise ratio of vacuum leaks within a vacuum system. Further, it may be desirable to establish a single leak threshold that is applicable whether the vacuum system is at sea level or at some higher altitude. For example, a vacuum leak detection method may be structured to compensate for barometric pressure so as to be less sensitive to changes in atmospheric pressure allowing vacuum leak rates to be compared to a single leak rate threshold.

The present description may provide several advantages. For example, the approach may simplify vacuum leak diagnostic calibration and thereby reduce system cost. Further, the approach may reduce a number of pressure sensors for diagnosing vacuum leaks in a vacuum system. Further still, the approach may improve the reliability of diagnosing vacuum leaks.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
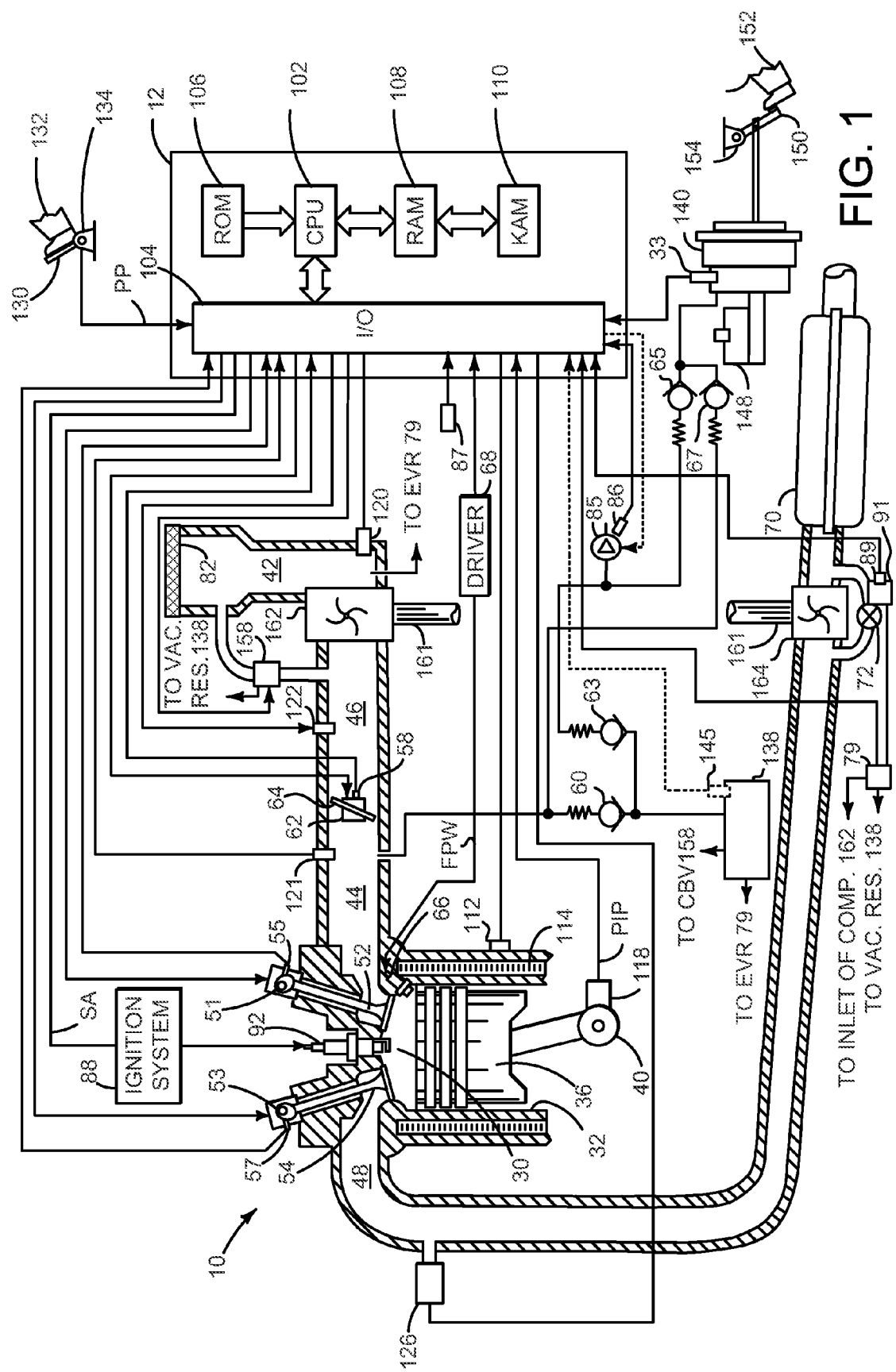
FIG. 1 shows a schematic depiction of an engine and vacuum system.
Figure 2:
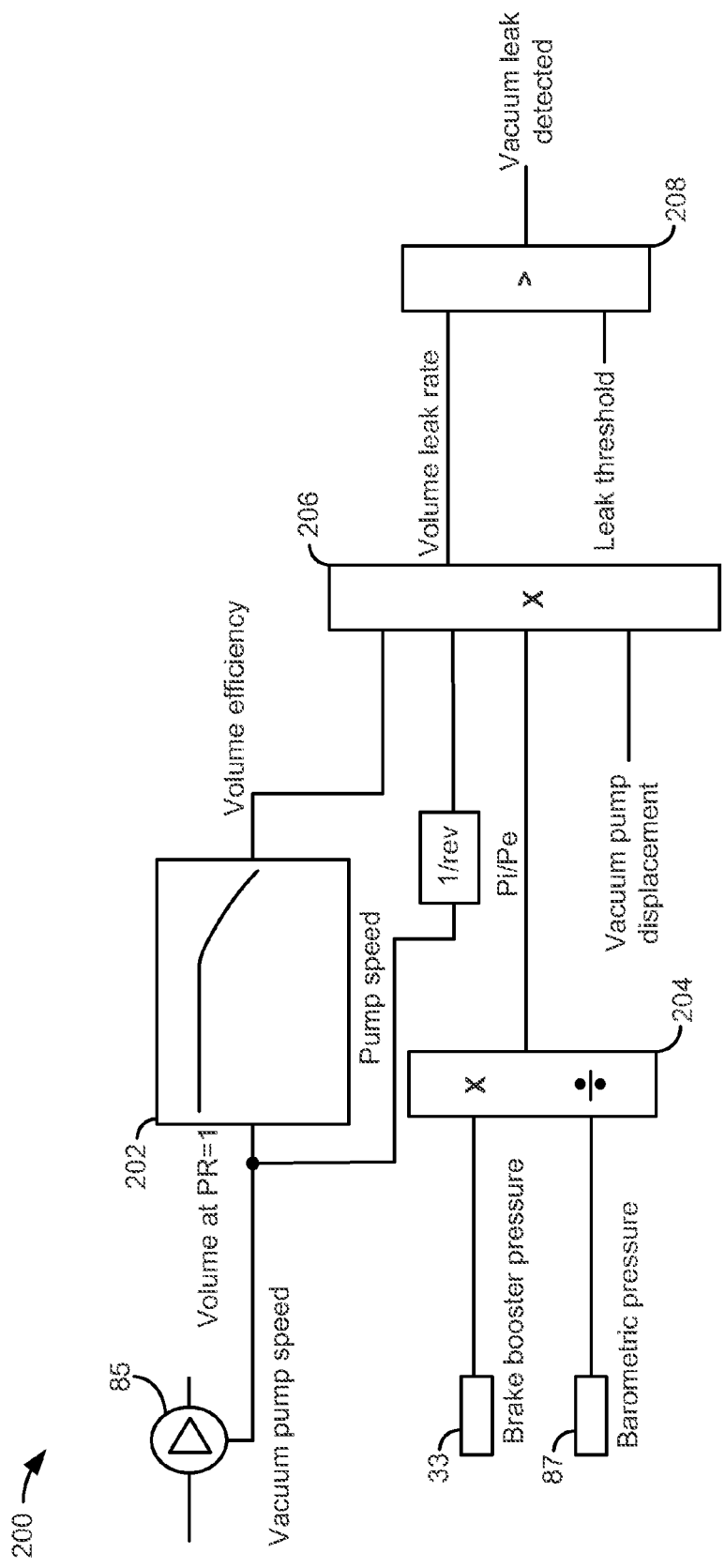
FIG. 2 shows a block diagram of a method for indicating a vacuum leak.
Figure 3:
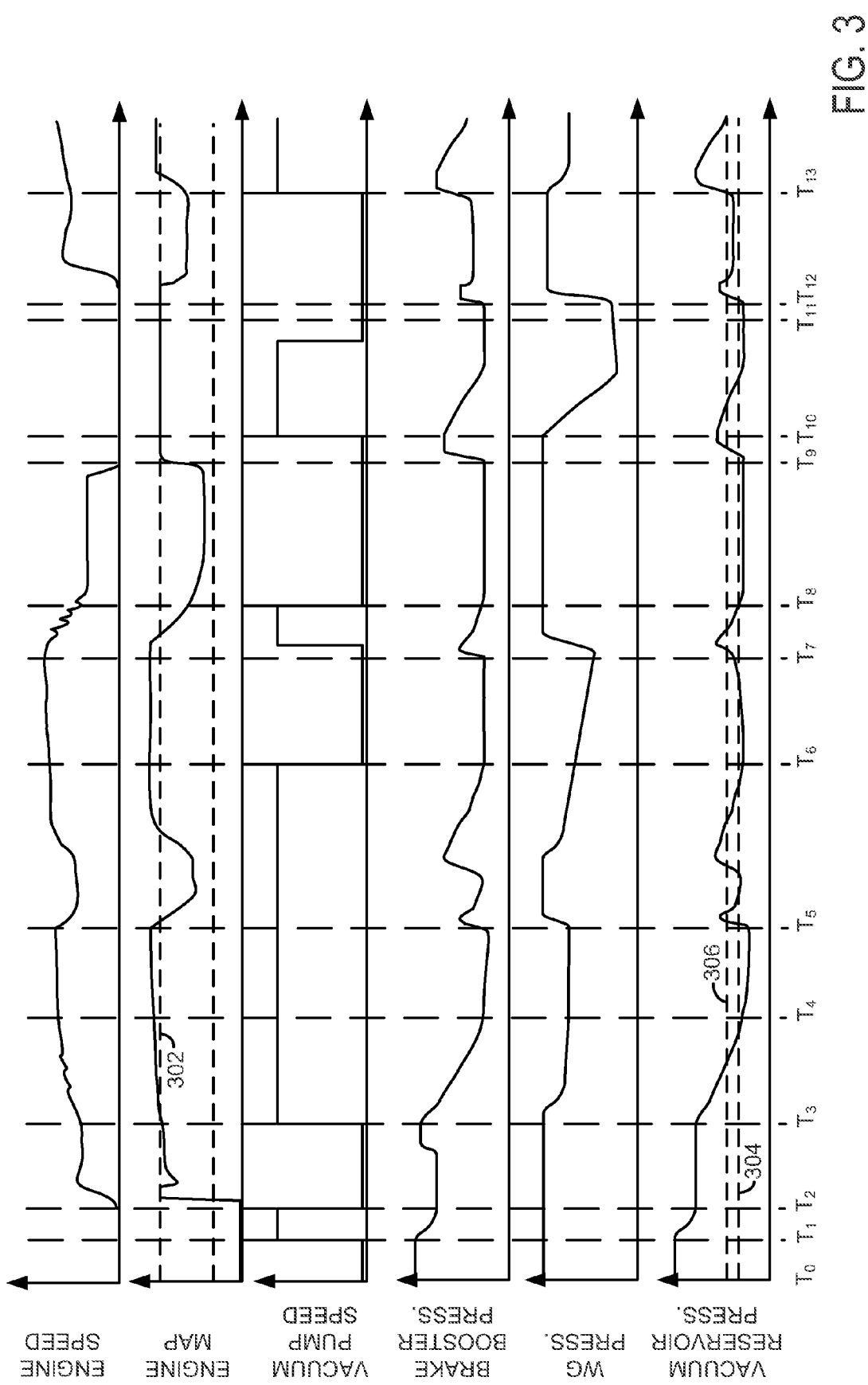
FIGS. 3 and 4 show simulated signals of interest during engine operation and engine stop conditions.
Figure 4:
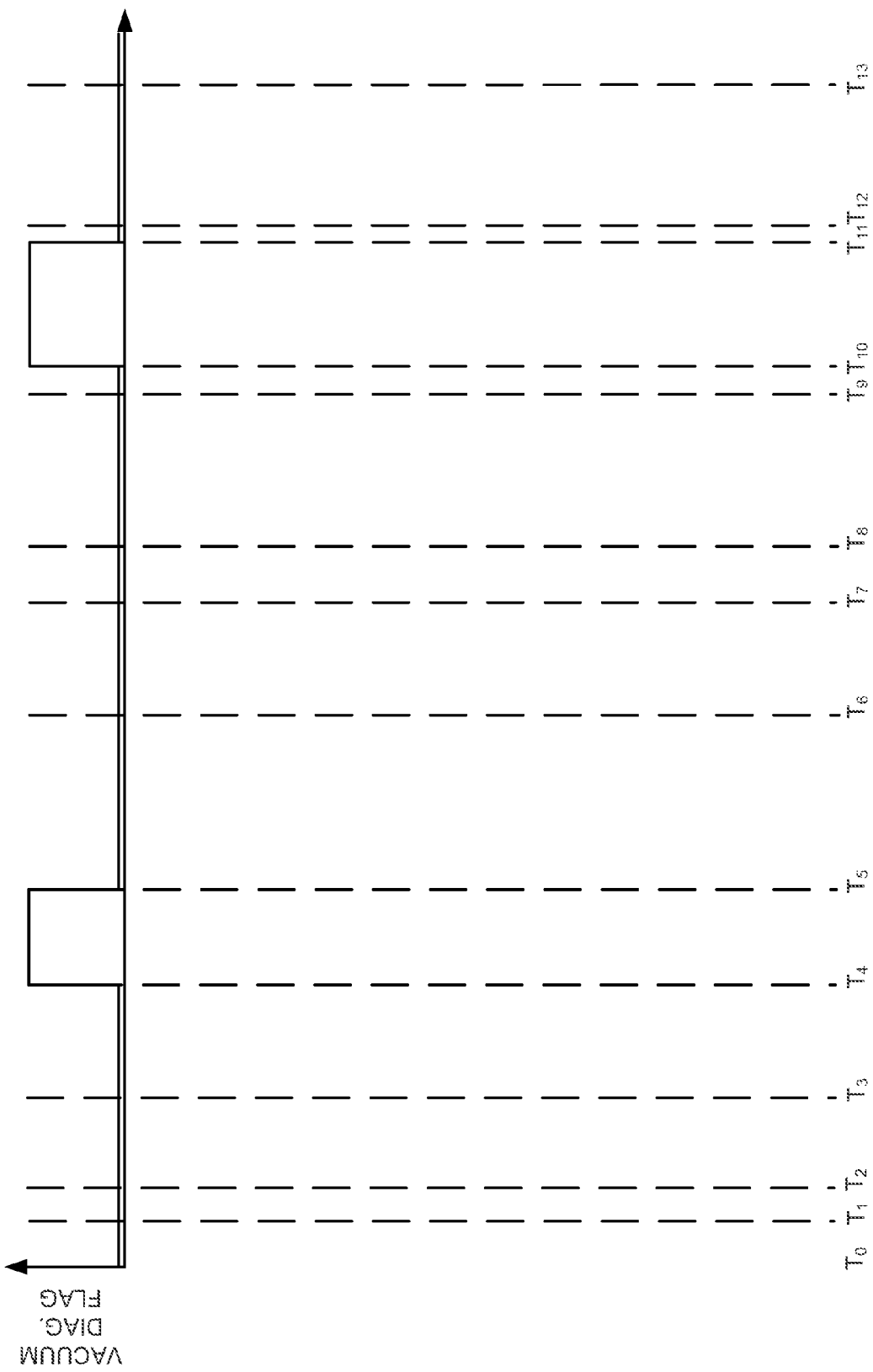
Figure 5:
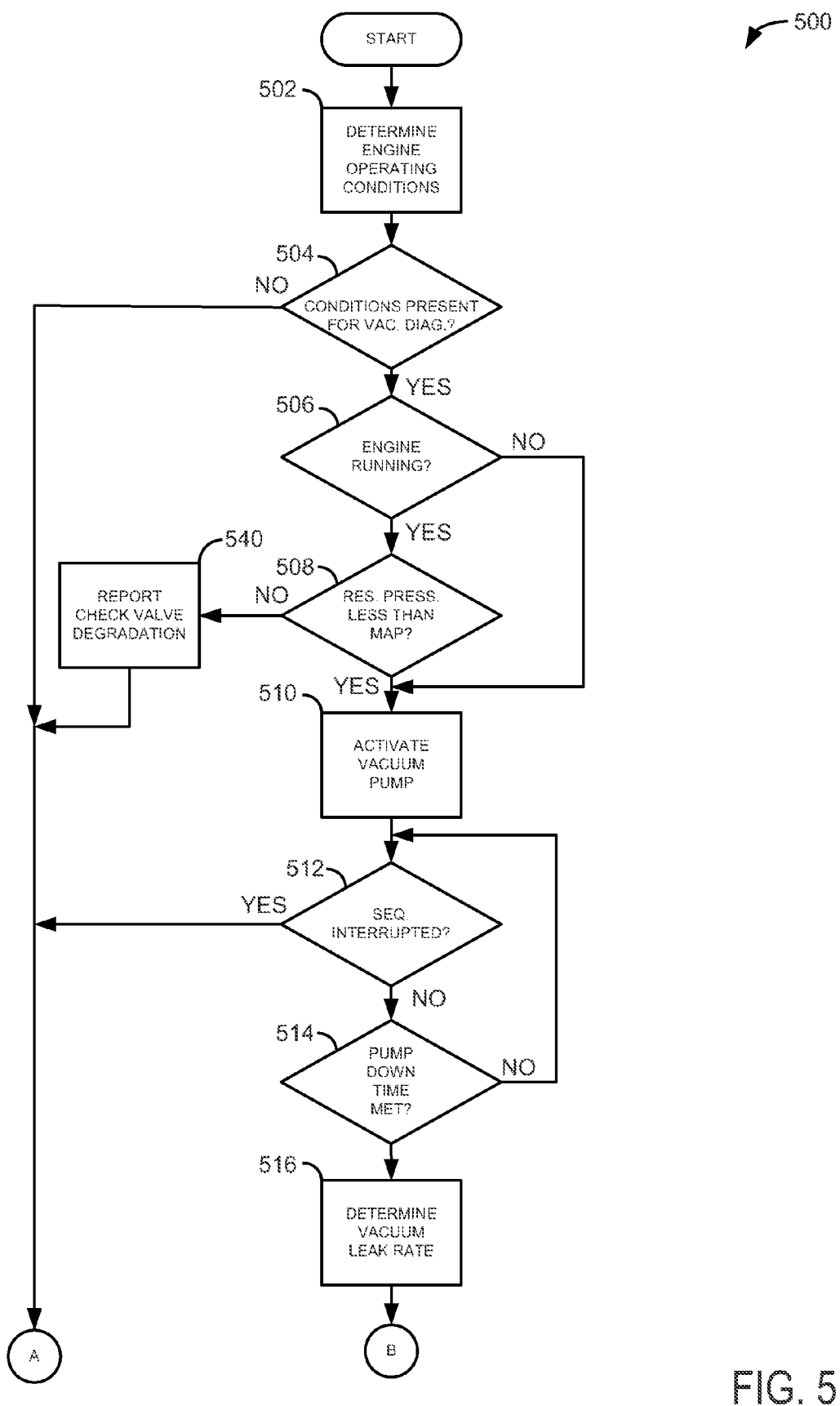
FIGS. 5 and 6 show high level flowcharts of a method for assessing vacuum leaks of a vehicle vacuum system.
Figure 6:
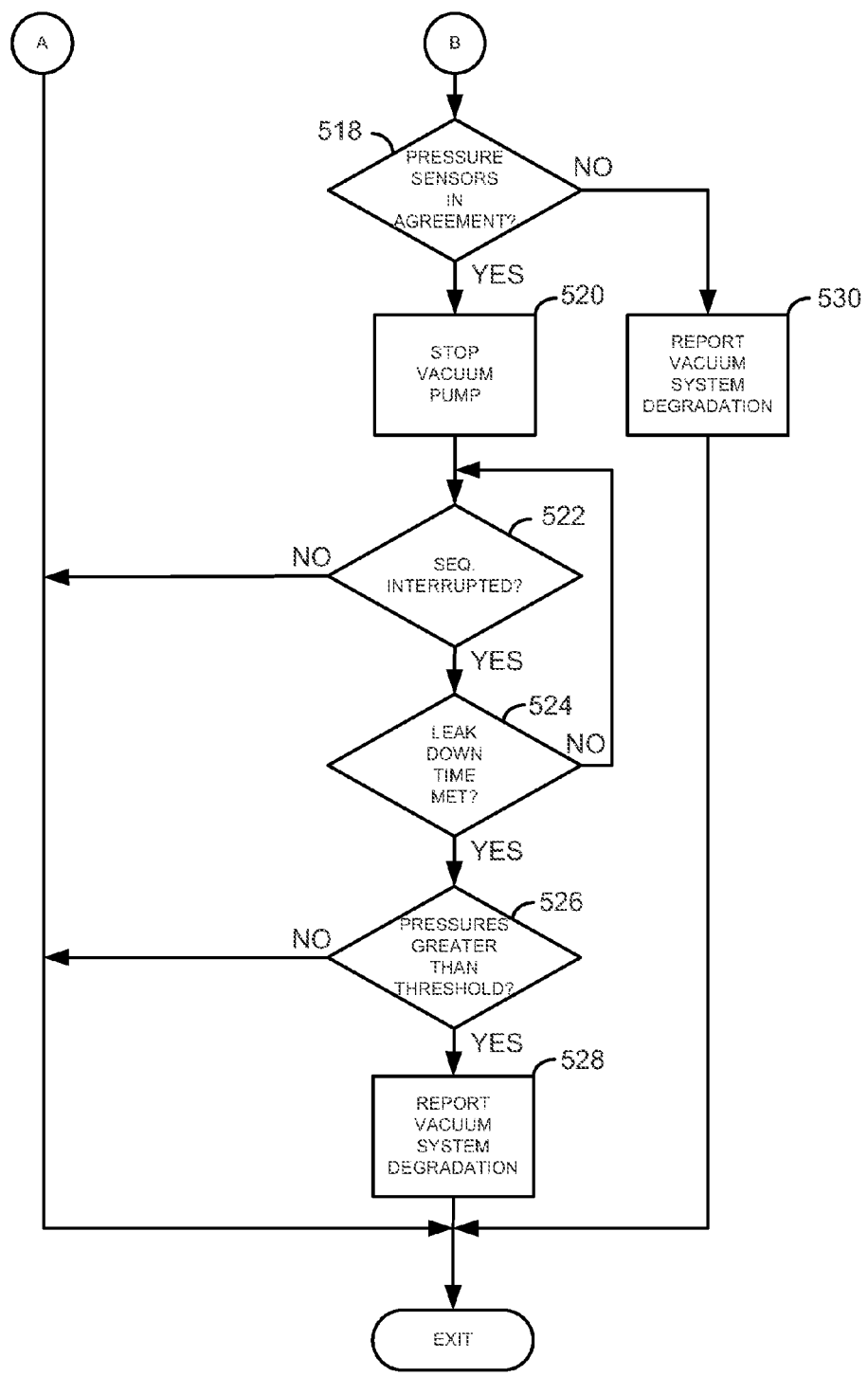

The present description is related to diagnosing vacuum leaks of a vacuum system of a vehicle. FIG. 1 shows an example engine including vacuum system for providing motive force to vehicle systems. FIG. 2 shows a block diagram of an example method for determining vacuum leaks of a vehicle. FIGS. 3 and 4 show simulated signals of interest when assessing vacuum leakage. FIGS. 5 and 6 show a high level flowchart for assessing vacuum system leaks via a vacuum pump and pressure decay leak testing.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air through air filter 82 and air intake 42 to supply boost chamber 46. Exhaust gases spin turbine 164 which is coupled to compressor 162 via shaft 161. Vacuum operated waste gate actuator 72 is supplied vacuum via wastegate vacuum reservoir 91 and it allows exhaust gases to bypass turbine 164 so that boost pressure can be controlled under varying engine operating conditions. Compressor bypass valve (CBV) 158 is vacuum operated via vacuum supplied by system vacuum reservoir 138. Boost pressure in boost chamber 46 may be reduced when compressor bypass valve 158 is opened since output of compressor 162 is fed back to the input of compressor 162.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine exhaust gases are directed to converter 70. Converter 70 can include multiple catalyst bricks, in one example. In another example, multiple emission control devices, each with multiple bricks, can be used. Converter 70 can be a three-way type catalyst in one example.

Vacuum for the vehicle vacuum system is stored in system vacuum reservoir 138. Vacuum reservoir 138 is in pneumatic communication with other vacuum system components via passages as shown. Vacuum may be supplied to system vacuum reservoir 138 via intake manifold 44 or vacuum pump 85. Vacuum pump 85 may be electrically driven as shown or mechanically driven via engine 10 through a clutch. Vacuum pump speed sensor 86 provides controller 12 an indication of vacuum pump speed. In some examples, vacuum pump speed may be estimated from vacuum pump current or engine speed. Check valve 60 allows air to flow from system vacuum reservoir 138 to intake manifold 44 and limits air flow from intake manifold 44 to system vacuum reservoir 138. Similarly, check valve 63 allows air to flow from system vacuum reservoir 138 to vacuum pump 85 and limits air flow from vacuum pump 85 to system vacuum reservoir 138. Brake booster 140 assists operator foot 152 to apply vehicle brakes via master cylinder 148 when brake pedal 150 is depressed. Brake booster may be supplied vacuum via intake manifold 44 or vacuum pump 85 and system vacuum reservoir 138. Check valve 65 allows air to flow from brake booster 140 to vacuum pump 85 and system vacuum reservoir 138 while it also limits air flow from system vacuum reservoir 138 to brake booster 140. Check valve 67 allows air to flow from brake booster 140 to intake manifold 44 while it also limits air flow from intake manifold 44 to brake booster 140. Brake booster 140 may also include an internal vacuum reservoir. Electric vacuum regulator 79 regulates a vacuum level in wastegate vacuum reservoir 91 via a source vacuum supplied from system vacuum reservoir 138 and a vent source supplied from air intake 42.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; vacuum reservoir vacuum from optional vacuum sensor 145; wastegate reservoir vacuum from vacuum sensor 89; brake booster vacuum from vacuum sensor 33; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be measured via sensor 87 for processing by controller 12. In alternative examples, barometric pressure may be inferred from a throttle position and a mass air flow sensor. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for determining vacuum leaks within a vehicle vacuum system, comprising: a vacuum pump; a pressure sensor; a barometric pressure sensor; a controller, the controller including instructions to activate the vacuum pump and detect a vacuum leak rate from a speed of the vacuum pump, the pressure sensor, and the barometric pressure sensor. The system includes where the barometric pressure sensor is a throttle or a diaphragm pressure sensor. The system also includes where the controller includes further instructions for comparing a volume leak rate to a sole leak threshold at a plurality of altitudes. In one example, the system includes where the controller includes additional instructions for limiting vacuum consumption from vacuum consumers of a vehicle during vacuum leak rate detection. The system further comprises additional controller instructions to deactivate the vacuum pump and perform a pressure decay leak diagnostic. The system further comprises additional controller instructions to indicate degradation of a check valve in response to output of the pressure sensor and a MAP sensor.

Referring now to FIG. 2, a block diagram of a method for indicating a vacuum leak of a vehicle vacuum system is shown. Block diagram 200 may be implemented in controller 12 of FIG. 1 via instructions. Further, the method described by block diagram 200 may be incorporated into the method of FIGS. 5 and 6 to provide the signals illustrated in FIGS. 3 and 4.

Speed from vacuum pump 85 is a basis for indexing table or function 202. Table or function 202 holds data representing vacuum volumetric efficiency versus vacuum pump speed at a pressure ratio (PR) across the vacuum pump equal to one. Vacuum pump 85 is a constant volume vacuum pump. The volumetric efficiency of vacuum pump 85 decreases at higher vacuum pump speeds as indicated in FIG. 2. Brake booster pressure is measured via sensor 33 and divided by barometric pressure at 204. Barometric pressure is measured by barometric pressure sensor 87. Since the brake booster is in pneumatic communication with the vacuum pump, the brake booster pressure divided by the barometric pressure yields a pressure drop across the vacuum pump. At 206, the vacuum pump vacuum volumetric efficiency is multiplied by the pressure ratio across the vacuum pump, vacuum pump speed, and vacuum pump displacement to yield the volume leak rate of the vacuum system. At 208, the volume leak rate of the vacuum system is compared to a sole leak threshold that is applied at all altitudes and barometric pressures. If the vacuum system volume leak rate is greater than the leak threshold, a condition of vacuum system degradation may be reported to the vehicle operator.

In this way, speed of a vacuum pump may be multiplied by a pressure ratio across the vacuum pump to yield a volume leak rate of a vacuum system. Further, since the vacuum volume is dependent on pressure ratio across the vacuum pump, compensation for barometric pressure is provided automatically.

Referring now to FIGS. 3 and 4, prophetic signals of interest during engine operation are shown. The signals of FIGS. 3 and 4 are part of the same operating sequence and are referenced by the same times $T_0$-$T_{13}$. The signals of FIGS. 3 and 4 may be provided via controller 12 executing instructions of the method of FIGS. 5 and 6 with the system of FIG. 1.

The first plot from the top of FIG. 3 represents engine speed versus time. The X axis represents time and time increases from the left to right side of the plot. The Y axis represents engine speed and engine speed increases in the direction of the Y axis arrow.

The second plot from the top of FIG. 3 represents engine manifold absolute pressure (MAP). The X axis represents time and time increases from the left to right side of the plot. The Y axis represents air pressure and air pressure increases in the direction of the Y axis arrow. Horizontal marker line 302 represents atmospheric pressure.

The third plot from the top of FIG. 3 represents vacuum pump speed versus time. The X axis represents time and time increases from the left to right side of the plot. The Y axis represents vacuum pump speed (e.g., 85 of FIG. 1) and vacuum pump speed increases in the direction of the Y axis arrow.

The fourth plot from the top of FIG. 3 represents brake booster pressure versus time. The X axis represents time and time increases from the left to right side of the plot. The Y axis represents brake booster pressure (e.g., 140 of FIG. 1) and brake booster pressure increases in the direction of the Y axis arrow.

The fifth plot from the top of FIG. 3 represents turbocharger wastegate reservoir pressure versus time. The X axis represents time and time increases from the left to the right side of the plot. The Y axis wastegate reservoir pressure (e.g., 91 of FIG. 1) and wastegate reservoir pressure increases in the direction of the Y axis arrow. The turbocharger wastegate may be configured as normally open or normally closed. In this particular example, the wastegate is configured normally closed.

The sixth plot from the top of FIG. 3 represents vacuum reservoir pressure versus time. The X axis represents time and time increases from the left to right side of the plot. The Y axis represents system vacuum reservoir pressure (e.g., 138 of FIG. 1) and vacuum reservoir pressure increases in the direction of the Y axis arrow. Higher levels of vacuum are present at the X axis. Horizontal line 304 represents a threshold pressure at which the vacuum pump may be deactivated to conserve energy. Horizontal line 306 represents a threshold pressure at which the vacuum pump may be reactivated if not already activated.

The first plot from the top of FIG. 4 represents a vacuum system diagnostic flag. The X axis represents time identical to the time shown in FIG. 3 and time increases from the left to right side of the plot. The Y axis represents whether or not a vacuum system diagnostic is active. A vacuum diagnostic is active when the vacuum diagnostic flag is at a higher level. The vacuum diagnostic is not active when the vacuum diagnostic flag is at a lower level.

At time $T_0$, the engine is stopped and no engine vacuum system diagnostic is being performed. Further, the brake booster, wastegate, and system vacuum reservoir pressures are at atmospheric pressure as may be the condition after a vehicle has been parked for an extended period of time. The vacuum pump is also turned off to conserve energy.

At time $T_1$, a key-on request is received from an operator and the vacuum pump is activated in response to the key-on condition. The vacuum pump begins to evacuate air from the vacuum system, the brake booster reservoir, and the system vacuum reservoir. Accordingly, the pressure in the brake booster and system vacuum reservoir is decreased.

At time $T_2$, the engine begins to be cranked and the vacuum pump is deactivated to increase the amount of electrical power available to the starter motor. The system vacuum reservoir and the brake booster reservoir are held at the pressure level at the time when the vacuum pump is deactivated. The wastegate pressure level remains near atmospheric pressure since the electrical vacuum regulator valve does not command the wastegate open at start. Although in some examples, the normally closed wastegate may be commanded to open at start to direct additional exhaust gas to the downstream catalyst.

Between time $T_2$ and time $T_3$, the engine is started and accelerates up to idle speed. Engine MAP briefly decreases and then moves toward atmospheric pressure as catalyst heating mode is started. During catalyst heating mode, engine air amount is increased and spark may be retarded so as to increase the amount of thermal energy supplied to the catalyst after engine start. Increasing heat to the catalyst allows the catalyst to process engine emissions with higher efficiency sooner.

At time $T_3$, the vacuum pump is reactivated and the engine speed increases in response to an increased operator torque demand. Engine MAP increases as boost is generated via the turbocharger compressor. The vacuum pump evacuates air from the system vacuum reservoir and the brake booster without aid from the intake manifold between time $T_3$ and time $T_4$. The wastegate reservoir pressure is reduced so as to allow some exhaust gases to bypass the turbocharger turbine so that extra boost may be reduced.

At time $T_4$, the system vacuum reservoir pressure reaches the threshold level where the vacuum pump may be deactivated to conserve energy; however, a vacuum system diagnostic is initiated as indicated by the vacuum diagnostic flag transitioning to a high state as shown in FIG. 4 so the vacuum pump remains active. The engine continues to operate and vacuum consumers are commanded to low vacuum consumption states or maintained in position so as to reduce vacuum consumption. The brake booster vacuum level decreases after time $T_4$ until reaching a minimum level that may be reflective of whether or not there is a vacuum leak within the vacuum system. The brake booster vacuum level approaches the vacuum level in the system vacuum reservoir. The method of FIG. 2 is executed during the time between time $T_4$ and $T_5$. In particular, vacuum pump speed is a basis for determining vacuum volume which is multiplied by the pressure ratio of brake booster pressure to barometric pressure to establish a vacuum volume leak rate. The vacuum volume leak rate is compared to a single leak threshold. In this example, the system vacuum reservoir pressure is reduced to a low level such that a low vacuum leak rate is determined. Accordingly, vacuum system degradation is not indicated.

At time $T_5$, the operator torque demand is reduced and vehicle brakes are applied. The reduction in engine torque command causes engine speed to decline and engine MAP is reduced as air is evacuated from the intake manifold during the vehicle deceleration. Further, the vacuum diagnostic is interrupted in response to air entering the vacuum system via the brake booster. In some examples, where the vacuum diagnostic is not interrupted, a vacuum decay vacuum leak test may be performed while the engine is operating.

The application of vehicle brakes causes pressure in the brake booster to increase. Air from the application of vehicle brakes flows to the system vacuum reservoir and the system vacuum reservoir pressure increases to a level where the vacuum pump may be reactivated. However, since the vacuum pump is already active it remains active. Since engine MAP is less than atmospheric pressure and since the vacuum pump is activated, both the intake manifold and the vacuum pump evacuate air from the system vacuum reservoir and the brake booster. Accordingly, the brake booster pressure and the system vacuum reservoir pressure are reduced. The system vacuum reservoir lags the brake booster since it receives air through a hose from the brake booster. The wastegate reservoir pressure is increased as the wastegate is closed. A short time later, the vehicle brake pedal is released and additional air enters the vacuum system via the brake booster. Air flows from the brake booster to the system vacuum reservoir and is evacuated from the vacuum system by the vacuum pump and the intake manifold. Additional engine torque is requested by the vehicle driver after the vehicle brake is released. The increased engine torque request increases engine speed and engine MAP. The increase in engine torque causes the wastegate reservoir pressure to be reduced since full boost pressure is not needed at these operating conditions.

At time $T_6$, pressure in the system vacuum reservoir is reduced to a level where the vacuum pump is temporarily deactivated. The vacuum pump remains deactivated between times $T_6$ and $T_7$ even though wastegate reservoir is reduced slightly allowing some air to flow into the system vacuum reservoir.

At time $T_7$, the operator reduces the engine torque request and engine speed begins to decline. The reduced engine torque demand allows air to be pumped from the engine intake manifold thereby reducing engine MAP. Shortly after the engine torque request is reduced, vehicle brakes are applied and air is allowed to flow into the brake booster. Air from the brake booster also flows into the system vacuum reservoir raising the vacuum reservoir pressure. The system vacuum reservoir pressure increases to above horizontal line 306 where the vacuum pump is reactivated. The wastegate reservoir pressure also increases in response to the decrease in engine torque demand so as to close the turbocharger wastegate. Between time $T_7$ and $T_8$, the vacuum pump and the intake manifold evacuate air from the vacuum system.

At time $T_8$, system vacuum reservoir pressure is reduced below horizontal line 304 where the vacuum pump can be deactivated to conserve energy. Engine speed remains at idle speed until the engine is commanded off shortly before time $T_9$. The vacuum pump remains off from time $T_8$ to time $T_9$.

At time $T_9$, the engine speed reaches zero and the vehicle brakes are released allowing air to flow into the brake booster and the system vacuum reservoir. Engine MAP increases to atmospheric pressure since engine cylinders no longer pump air from the intake manifold while the engine is stopped.

At time $T_{10}$, a vacuum system diagnostic is initiated as indicated by the vacuum diagnostic flag transitioning to a high state as shown in FIG. 4. The vacuum pump is commanded on and vacuum consumers are commanded to low vacuum consumption states. However, the wastegate is commanded to an open state so that vacuum level in the wastegate vacuum reservoir can approach the vacuum level in the system vacuum reservoir. In one example, the pressure downstream of an electric vacuum regulator (e.g., 79 of FIG. 1) substantially matches the pressure upstream of the electric vacuum regulator when the vacuum regulator is commanded to a position greater or less than a threshold position. Pressure in the brake booster, wastegate reservoir, and the system vacuum are reduced in response to activating the vacuum pump. The vacuum pump continues to operate and after a delay, the method of FIG. 2 is initiated to determine whether or not any vacuum leaks are present in the vacuum system.

If pressure in the vacuum system is higher than an expected pressure after the pump has been operating for a predetermined amount of time, it may be determined that a vacuum leak is present in the vacuum system. Further, since pressure transducers are located in the brake booster and wastegate reservoirs as well as potentially in the system vacuum reservoir, vacuum leaks may be detected in different vacuum zones of the vacuum system that are isolated from other zones via check valve. For example, a first vacuum zone may be the brake booster while a second vacuum zone may be the wastegate vacuum reservoir. If a pressure in the first vacuum zone is higher than a pressure in the second vacuum zone it may be determined that the zone with the higher pressure is experiencing a leak. Similarly, if the system vacuum reservoir includes a pressure sensor, pressures in the brake booster and the wastegate reservoir can be compared against the pressure in the system vacuum reservoir. If the pressure in the system vacuum reservoir is less than pressure in the brake booster or the wastegate vacuum reservoir, an impeded vacuum line condition may be determined and reported to the vehicle operator along with the zone where the degradation is determined.

After the system is checked for vacuum leaks according to the method of FIG. 2, the vacuum pump is deactivated and a pressure decay leak test is commenced. Pressures in the different zones of the vacuum system are individually monitored, and if a pressure in one of the zones exceeds a threshold value, degradation may be reported for that vacuum zone. For example, if the pressure in the brake booster zone is higher than a predetermined threshold, degradation in the brake booster zone may be reported. If pressure in the wastegate reservoir zone is higher than a predetermined threshold, degradation in the wastegate reservoir zone may be reported. In this way, degradation of individual vacuum zones may be reported. Check valves in the vacuum system may make it possible to determine degradation in specific vacuum zones. If pressures in the different vacuum zones are maintained for a predetermined amount of time, no vacuum degradation is reported to the vehicle operator.

At time $T_{11}$, vehicle brakes are applied just before engine starting. Applying vehicle brakes allows air to enter the brake booster and the system vacuum reservoir. If the vacuum diagnostic is not completed by the time the vehicle brake is applied, the vacuum diagnostic may be interrupted and stopped. The engine is restarted shortly after the vehicle brake is applied. In this example engine restart, the time between key on and engine crank is low. Therefore, the vacuum pump is not reactivated until time $T_{13}$.

Between time $T_{12}$ and time $T_{13}$, the engine is started. In this example, the engine is still warm at the time of restart. Therefore, the engine may be operated at a lower MAP and the intake manifold can evacuate air from the brake booster and the system vacuum reservoir. The brake booster pressure also increases near time $T_{13}$ as the brake pedal is released. Rising pressure in the system vacuum reservoir causes the vacuum pump to be reactivated. The vehicle drive cycle continues after time $T_{13}$.

Referring now to FIGS. 5 and 6, a high level flowchart of a method for assessing vacuum leaks of a vehicle vacuum system is shown. The method of FIGS. 5 and 6 may be executed via instructions of a controller such as controller 12 in a system such as the system of FIG. 1.

At 502, method 500 determines engine operating conditions. Engine operating conditions may include but are not limited to engine speed, engine load, brake booster pressure, system reservoir pressure, wastegate reservoir pressure, throttle position, and vacuum pump speed. Method 500 proceeds to 504 after engine operating conditions are determined.

At 504, method 500 judges whether or not conditions are present for conducting vacuum system diagnostics. In one example, a vacuum system diagnostic may be instituted after a predetermined amount of time or after a predetermined number of vehicle drive cycles. Further, a vacuum system diagnostic may be conducted if commands to the vacuum actuators are greater or less than expected values. If conditions are present for a vacuum diagnostic, method 500 proceeds to 506. Otherwise, method 500 proceeds to exit.

At 506, method 500 judges whether or not the engine is running. If so, method 500 proceeds to 510. Otherwise, method 500 proceeds to 508.

At 508, method 500 judges whether or not system vacuum reservoir (e.g., 138 of FIG. 1) pressure is less than MAP. If so, method 500 proceeds to 510. Otherwise, method 500 proceeds to 540. Method 500 compares MAP to system vacuum reservoir pressure so that a vacuum diagnostic based on vacuum pump speed is not influenced by intake manifold pressure evacuating air from the vacuum system.

At 540, method 500 reports check valve degradation and/or vacuum system degradation. If vacuum in the vacuum reservoir is greater than map, flow through a check valve (e.g., 60 of FIG. 1) may be limited. Method 500 proceeds to exit after reporting check valve and vacuum system degradation.

At 510, method 500 activates the vacuum system vacuum pump (e.g., 85 of FIG. 1). If the vacuum pump is electrically actuated, electrical power is supplied to the vacuum pump. If the vacuum pump is driven by the engine, a clutch may be engaged. Method 500 proceeds to 512 after the vacuum pump is activated.

At 512, method 500 determines whether or not the vacuum system diagnostic is interrupted. In one example, the vacuum system diagnostic may be interrupted by application or release of vehicle brakes. Since application of vehicle brakes may influence brake booster pressure, the vacuum diagnostic may be ceased and reporting of vacuum system degradation may be inhibited if brakes are actuated or released. If the vacuum diagnostic has been interrupted, method 500 proceeds to exit the vacuum system diagnostic. Otherwise, method 500 proceeds to 514.

At 514, method 500 judges whether a predetermined vacuum system pump down time (e.g., an amount of time where an operating vacuum pump should be able to pump air from a vacuum system and reach a substantially stable pressure) has been met. In one example, a timer is started and counts down to zero. If a value of the counter is greater than zero and the vacuum system pump down time has not been met, method 500 returns to 512. Otherwise, method 500 proceeds to 516.

At 516, the method of FIG. 2 is performed to determine a vacuum leak rate. In particular, a vacuum pump speed is used to determine a vacuum volume. The vacuum volume is multiplied by a pressure ratio across the vacuum pump to determine a volume leak rate of the vacuum system. The vacuum leak rate is compared to single vacuum leak rate threshold that applies at all altitudes and barometric pressures. If the vacuum leak rate is less than the single vacuum leak rate threshold, no vacuum system degradation is reported in this portion of the vacuum system diagnostic. Method 500 proceeds to 518 after the vacuum leak rate is determined.

At 518, method 500 cross compares pressures of different areas of the vacuum system against each other. For example, if a pressure of the system vacuum reservoir is less than a pressure of the brake booster it may be determined that a vacuum line or check valve between the system vacuum reservoir and the brake booster is degraded. Similarly, if a pressure in the system vacuum reservoir is less than a pressure of the wastegate reservoir when the electric vacuum regulator is commanded to a position where a pressure at the input of the regulator is at the output of the regulator, it may be determined that a vacuum line or check valve between the system vacuum reservoir and the wastegate reservoir is degraded. If the pressures in the vacuum system are substantially the same, method 500 proceeds to 520. Otherwise, method 500 proceeds to 530.

At 518, it may also be judged if a pressure of the vacuum system is following a pressure of the intake manifold to determine whether or not degradation of a vacuum line or check valve between the intake manifold and the brake booster or wastegate reservoir is present. If the pressure of the brake booster follows the intake manifold pressure when the brakes are not applied then it may be determined that there is degradation of a vacuum line or check valve positioned between the brake booster and the intake manifold. Similarly, if the pressure of the system vacuum reservoir or wastegate follows the intake manifold pressure when the little vacuum is consumed by vehicle vacuum consumers, it may be determined that there is degradation of a vacuum line or check valve positioned between the system vacuum reservoir or the wastegate reservoir and the intake manifold. Alternatively, if pressure of the brake booster or wastegate reservoir is higher than pressure of the system vacuum reservoir, it may be determined that there is a restriction in a vacuum line.

At 530, method 500 reports a condition of degradation of the vacuum system to the vehicle operator. The condition of degradation may be reported via a light or a message to an operator control console. Method 500 exits after reporting a condition of vacuum system degradation.

At 520, method 500 stops the vacuum pump from operating and vacuum consumers of the vehicle are held in minimum vacuum consumption states or commanded to minimum vacuum consumption states. Method 500 proceeds to 522 after the vacuum pump is stopped.

At 522, method 500 judges whether or not the vacuum diagnostic is interrupted. As mentioned, the vacuum diagnostic may be interrupted by application of vehicle brakes or via another condition where air may be introduced to the vacuum system. If the vacuum diagnostic sequence is interrupted, method 500 proceeds to exit. Otherwise, method 500 proceeds to 524.

At 524, method 500 judges whether or not a leak down time (e.g., a predetermined amount of time that allows vacuum to leak so that the leak may be detected via a pressure transducer) has been met since the vacuum pump was deactivated. If so, method 500 proceeds to 526. If not, method 500 returns to 522.

At 526, method 500 determines if any of the pressure sensors of the vacuum system (e.g., system vacuum reservoir pressure sensor, brake booster pressure sensor, or wastegate reservoir pressure sensor) indicate a pressure greater than a predetermined threshold pressure. If a pressure is greater than a threshold pressure, method 500 may judge that a vacuum leak is present in a vacuum system zone where the pressure sensor is located and proceed to 528. Otherwise, method 500 may judge no vacuum leak is detected and method 500 may exit. In another example, if a pressure of the system vacuum reservoir is less than a pressure of the brake booster or the wastegate reservoir, it may be determined that a vacuum line or check valve between the system vacuum reservoir and the brake booster or wastegate reservoir is degraded.

At 528, method 500 reports a condition of degradation of the vacuum system to the vehicle operator. The condition of degradation may be reported via a light or a message to an operator control console. Method 500 exits after reporting a condition of vacuum system degradation.

Thus, the method of FIG. 5 provides for method for assessing vacuum system degradation for a vehicle, comprising: operating a vacuum pump during a condition of substantially no vacuum consumption via vacuum consumers of the vehicle; and providing an indication of vacuum degradation for the vehicle via a single vacuum leak threshold, the single vacuum leak threshold referenced to a leak rate at a plurality of altitudes. The method includes where the indication of vacuum degradation is responsive to a speed of the vacuum pump, barometric pressure, and a pressure of a vacuum system. The method includes where the vacuum pump is an electrically driven vacuum pump. The method further comprises deactivating the vacuum pump and performing a pressure decay leak test of a vacuum system. The method includes where the vacuum pump is operating when an engine of the vehicle is operating. In one example, the method includes where the vacuum pump is operating when an engine of the vehicle is not operating. The method also includes where the indication of vacuum degradation is based on an operating condition where a pressure of a vacuum reservoir is lower than a pressure of an intake manifold of an engine.

In another example, the method of FIG. 5 includes assessing vacuum system degradation for a vehicle, comprising: limiting vacuum consumption of at least one vacuum consumer; operating a vacuum pump during a condition of substantially no vacuum consumption via vacuum consumers of the vehicle; and providing an indication of vacuum degradation for the vehicle via a speed of the vacuum pump, barometric pressure, and a pressure of a vacuum system. The method also includes where a vacuum volume leak rate is determined in response to the speed of the vacuum pump, and where a single vacuum leak threshold is a basis for providing the indication of vacuum degradation. The method further comprises multiplying a pump volume with a pressure ratio to provide a volume leak rate and comparing the volume leak rate to the single vacuum leak threshold. The method further comprises deactivating the vacuum pump and performing a pressure decay leak diagnostic. In one example, the method further comprises diagnosing degradation of one or more check valves of the vacuum system via a pressure difference between a reservoir pressure and MAP. The method includes where the reservoir pressure is taken from a brake booster. The method further comprises inhibiting providing the indication of vacuum degradation in response to operating brakes of the vehicle.

As will be appreciated by one of ordinary skill in the art, the methods described in FIGS. 5 and 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for assessing degradation of a vacuum system of a vehicle, comprising:
   operating a vacuum pump during a condition of substantially no vacuum consumption via vacuum consumers of the vehicle; and
   providing an indication of vacuum degradation for the vehicle in response to a volume leak rate exceeding a single volume leak threshold, the single volume leak threshold applied at a plurality of altitudes.

2. The method of claim 1, where the indication of vacuum degradation is responsive to a speed of the vacuum pump, barometric pressure, and the pressure of a vacuum system.

3. The method of claim 1, where the vacuum pump is an electrically driven vacuum pump.

4. The method of claim 1, further comprising deactivating the vacuum pump and performing a pressure decay leak test of the vacuum system.

5. The method of claim 1, where the vacuum pump is operating when an engine of the vehicle is operating.

6. The method of claim 1, where the vacuum pump is operating when an engine of the vehicle is not operating.

7. The method of claim 1, where the indication of vacuum degradation is based on an operating condition where a pressure of a vacuum reservoir is lower than a pressure of an intake manifold of an engine.

8. A method for assessing vacuum system degradation for a vehicle, comprising:
   limiting vacuum consumption via vacuum consumers of the vehicle;
   operating a vacuum pump during a condition of substantially no vacuum consumption via the vacuum consumers of the vehicle; and
   providing an indication of vacuum degradation for the vehicle via a speed of the vacuum pump, barometric pressure, and a pressure of a vacuum system.

9. The method of claim 8, where a vacuum volume leak rate is determined in response to the speed of the vacuum pump, and where a single volume leak threshold is a basis for providing the indication of vacuum degradation.

10. The method of claim 9, further comprising multiplying a pump volume with a pressure ratio to provide the volume leak rate and comparing the volume leak rate to the single volume leak threshold.

11. The method of claim 8, further comprising deactivating the vacuum pump and performing a pressure decay leak diagnostic.

12. The method of claim 8, further comprising determining a vacuum reservoir pressure and a manifold absolute pressure, and diagnosing degradation of one or more check valves of the vacuum system via a pressure difference between the reservoir pressure and the manifold absolute pressure.

13. The method of claim 12, where the reservoir pressure is determined at a brake booster.

14. The method of claim 8, further comprising inhibiting providing the indication of vacuum degradation in response to operating brakes of the vehicle.

15. A system for determining vacuum leaks within a vehicle vacuum system, comprising:
   a vacuum pump;
   a pressure sensor;
   a barometric pressure sensor;
   a controller, the controller including instructions for activating the vacuum pump and instructions for detecting a vacuum leak rate while the vacuum pump is activated, the vacuum leak rate determined from a speed of the vacuum pump, the pressure sensor, and the barometric pressure sensor.

16. The system of claim 15, where the barometric pressure sensor is a throttle or a diaphragm pressure sensor.

17. The system of claim 15, where the controller includes further instructions for comparing a volume leak rate to a sole leak threshold at a plurality of altitudes.

18. The system of claim 15, where the controller includes additional instructions for limiting vacuum consumption from vacuum consumers of a vehicle during vacuum leak rate detection.

19. The system of claim 15, further comprising additional controller instructions to deactivate the vacuum pump and perform a pressure decay leak diagnostic.

20. The system of claim 19, further comprising additional controller instructions to indicate degradation of a check valve in response to an output of the pressure sensor and an output of a manifold absolute pressure sensor.

* * * * *